United States Patent [19]

Shoen

[11] Patent Number: 5,529,054
[45] Date of Patent: Jun. 25, 1996

[54] SOLAR ENERGY CONCENTRATOR AND COLLECTOR SYSTEM AND ASSOCIATED METHOD

[76] Inventor: Neil C. Shoen, 9817 Freestate Pl., Gaithersburg, Md. 20879

[21] Appl. No.: 262,554

[22] Filed: Jun. 20, 1994

[51] Int. Cl.$^6$ ............................................. F24J 2/08
[52] U.S. Cl. ...................... 126/681; 126/680; 126/685; 126/600; 126/714
[58] Field of Search ................................. 126/600, 685, 126/680, 681, 714

[56] References Cited

U.S. PATENT DOCUMENTS

| 683,089 | 9/1901 | Wideen | 126/681 |
|---|---|---|---|
| 4,070,861 | 1/1978 | Scragg et al. | 126/681 X |
| 4,364,532 | 12/1982 | Stark | 244/30 |
| 4,581,897 | 4/1986 | Sankrithi | 126/680 X |
| 4,788,555 | 11/1988 | Schultz et al. | 126/438 X |
| 4,865,266 | 9/1989 | George | 244/31 |
| 5,347,986 | 9/1994 | Cordy | 126/574 |
| 5,404,868 | 4/1995 | Sankrithi | 126/604 |

*Primary Examiner*—Larry Jones
*Attorney, Agent, or Firm*—R. Neil Sudol; Henry D. Coleman

[57] ABSTRACT

A power generating system comprises a solar concentrator defining an effectively concave reflective surface on a surface of the earth for concentrating incoming solar energy. A solar collector is disposed in an underground chamber provided with an access opening. The solar collector receives solar energy concentrated by the concentrator and converting the concentrated solar energy to another energy form, generally thermal energy, which is subsequently convertible to electrical power. Directional componentry is provided for directing concentrated solar energy from the concentrator along a predefined folded transmission path through the access opening to the collector.

37 Claims, 3 Drawing Sheets

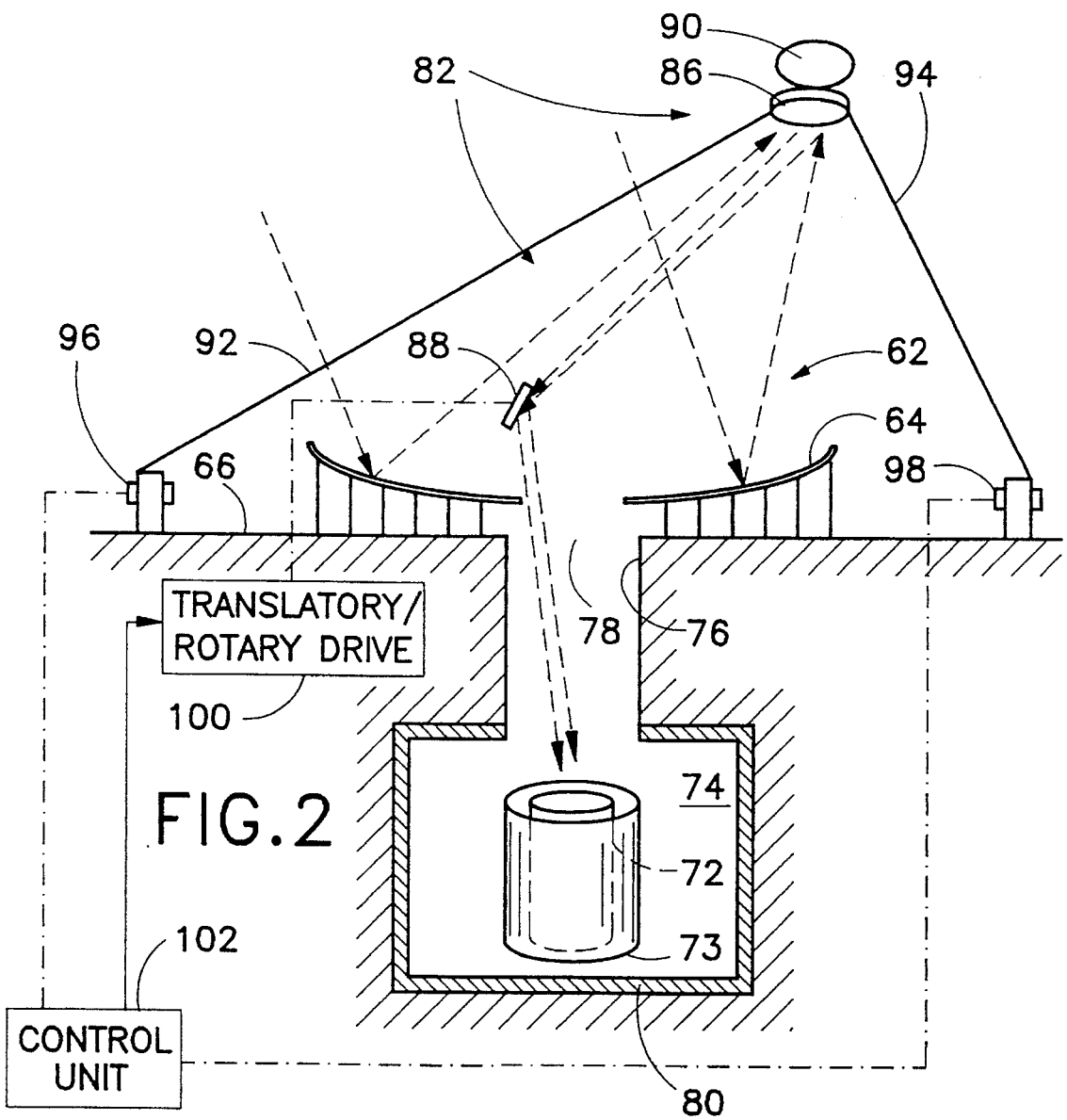
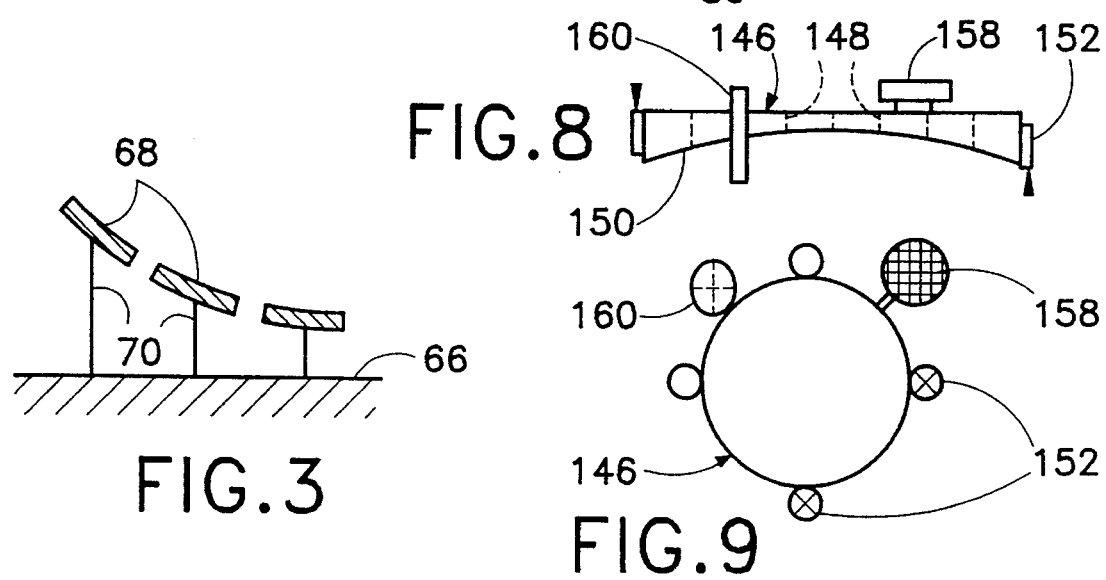

SOLAR ENERGY CONCENTRATOR AND COLLECTOR SYSTEM AND ASSOCIATED METHOD

BACKGROUND OF THE INVENTION

This invention relates to a power generating system and an associated method. More particularly, this invention relates to a solar energy power station and an associated method for generating energy from incoming solar radiation.

Solar energy collection facilities have not come into general use mainly owing to cost. Although solar energy is clean and environmentally safe and basically limitless, the costs of building and operating solar energy facilities, as well as relatively low operating efficiencies, have kept the price of solar power well above the costs of conventionally generated electrical power.

Large solar energy collection facilities which rely on a high-temperature thermal energy intermediate for the conversion from solar energy to electrical power conventionally comprise a primary reflector having a multiplicity of movable reflective segments. The reflective segments direct incoming solar radiation to an elevated thermal generator subassembly. This thermal generator subassembly is mounted on an expensive tower and is exposed or accessible from generally all directions to receive radiation reflected from each segment of the primary reflector. The movable reflector segments each require a motor and control unit to track the sun, which contributes to expense and reduces reliability especially in harsh environments such as wind blown sandy deserts.

One source of inefficiency in this conventional system is re-radiation of energy from the thermal collector/generator surfaces. Energy concentrated from incoming solar radiation is is thus lost to the environment rather than being converted into electrical power.

Another disadvantage of this conventional solar energy collection facility is thermal time constant problems resulting in lost operation due to a slow ramp-up to operating temperatures during solar "down time" (night time). Another factor affecting the economic viability of this system is the need for off-cycle auxiliary power (some systems use natural gas).

OBJECT OF THE INVENTION

An object of the present invention is to provide an improved solar collecting system.

Another object of the present invention is to provide a solar collecting system of the thermal conversion type wherein power costs are reduced as compared with conventional thermal conversion type solar collecting assemblies.

Another, more particular, object of the present invention is to provide such a system which has higher thermal conversion efficiencies and less expensive housing and support structures.

A further object of the present invention is to provide an associated method for converting solar energy into electrical power.

These and other objects of the present invention will be apparent from the drawings and detailed descriptions herein.

SUMMARY OF THE INVENTION

A power generating system comprises, in accordance with the present invention, a solar concentrator defining an effectively concave stationary reflective surface on a surface of the earth for concentrating incoming solar energy. A solar collector is also disposed on the earth's surface. The solar collector receives solar energy concentrated by the concentrator and converts the concentrated solar energy to another energy form, generally thermal energy, which is subsequently convertible to electrical power. Directional componentry is provided for directing concentrated solar energy from the concentrator along a predefined folded transmission path to the collector.

According to a preferred feature of the present invention, the collector is disposed in an underground chamber or cavity for purposes of collecting energy which is reradiated by the collector.

According to another feature of the present invention, the directional componentry includes a pair of mirrors spaced from one another, as well as shifting elements operatively connected to the mirrors for moving the mirrors to track the sun, i.e., to ensure continued guidance of the concentrated solar energy through the access opening to the collector during a substantial portion of a day. The shifting elements may include one or more rotary drives operatively connected to one of the mirrors for pivoting that mirror. Where one mirror is located at a greater elevation than the concentrator and the other mirror, the shifting elements may further include a translatory drive operatively connected to the higher mirror for shifting that mirror laterally. The second, lower mirror is preferably located in relative juxtaposition to the access opening to the underground chamber and is pivoted by the rotary drive to guide, through the access opening, radiation concentrated by the concave reflective surface and reflected downwardly by the first mirror.

In a solar power system in accordance with the present invention, the concentration of solar radiation is accomplished by a stationary reflector, while the tracking of the sun is implemented by two relatively small mirrors. In contrast with conventional solar collecting assemblies of the thermal conversion type, which have multiple concentrator segments each moved by its own driving or tracking device, a solar power system in accordance with the present invention requires drives for just two mirrors.

The primary reflector may itself comprise a multiplicity of mirror segments, to facilitate assembly or installation. However, all of these mirror segments are fixed to the earth and require no moving parts. This reduction in the number of moving parts not only reduces initial capitalization expenditures but also reduces maintenance costs since it is the moving parts which are most likely to require replacement or repair. Damage to the primary reflector by the elements can be further reduced by disposing the reflector below ground level, in a depression or recess.

The directional mirrors may be configured to further focus the concentrated solar rays from the primary reflector.

According to a further feature of the present invention, the directional componentry includes a lighter-than-air balloon supporting the first or higher mirror. The balloon with its attached mirror is anchored to the surface of the earth by a plurality of tension cables. In that case, the shifting of the mirror may be accomplished by selectively paying out and alternately retracting the cables.

Of course, the concentration of solar radiation may be implemented by a plurality of concave reflective surfaces spaced from one another on the surface of the earth. In that event, the directional componentry includes a plurality of mirrors equal in number to the reflective surfaces and each disposed at a greater elevation than a respective reflective surface. Where the directional componentry includes shifting elements operatively connected to the mirrors for moving the mirrors to ensure continued guidance of the concentrated solar energy through the access opening to the collector during a substantial portion of a day.

It is generally contemplated that the collector includes a boiler. The boiler may be operatively coupled to steam turbines for driving electrical generators.

According to an additional feature of the present invention, the underground chamber is provided with a heat absorbing lining, whereby energy radiating from the collector is at least partially captured.

According to a supplemental feature of the present invention, an auxiliary reflector is disposed in geostationary orbit above the earth and positioning elements are fixed to the auxiliary reflector for aiming the auxiliary reflector towards the reflective surface on the earth during a substantial portion of night time at the collector. In this way, the solar energy collection facility can be used through as much as 80 percent of the normal night time, in addition to the day light hours. This will increase efficiency and concomitantly reduce energy costs.

The auxiliary reflector may be positioned to continuously reflect solar rays to the ground based primary reflector or reflective surface by a plurality of ion thrusters. These thrusters may be powered by solar energy collected by solar cells attached to the auxiliary reflector. The thrusters may be controlled in response to an alignment signal carried from the primary reflector or reflective surface via a lower-power laser beam generated at the earth's surface proximately to the primary reflector.

Alternatively, the costs of the solar power facility can be spread out by utilizing the earth bound hardware for other purposes. For example, if a radio antenna is disposed above the primary reflector or reflective surface and is connected for radio signal processing, then radio astronomers may use the facility at least during the night hours.

A power generating method comprises, in accordance with the present invention, the steps of (a) reflecting solar energy at least partially upwardly from a surface of the earth, (b) directing the reflected energy along a folded path to a solar energy collector in an underground chamber, (c) focusing the reflected energy upon the collector, and (d) operating the collector to convert the concentrated solar energy to another energy form.

Pursuant to another feature of the present invention, the directing of the reflected energy includes the step of shifting a plurality of mirrors disposed along the transmission path, thereby ensuring continued guidance of the reflected solar energy to the collector during a substantial portion of a day. This shifting may include the steps of translating at least one of the mirrors and rotating another of the mirrors. More preferably, the shifting includes rotating and translating both of the mirrors. The shifting may include the step of selectively paying out and alternately retracting cables extending to a lighter-than-air balloon supporting one of the mirrors, that mirror being secured to the balloon. The mirror may be suspended by cables from the balloon.

Pursuant to another feature of the present invention, the method further comprises the step of absorbing heat radiated from the collector. The absorption is accomplished, for example, by disposing heat conductive insulation along a wall of the underground chamber. The insulation may reradiate heat back to the collector and or convey the heat to a fluid moving through pipes embedded in the insulation.

Pursuant to a further feature of the present invention, the method also comprises the step of converting, into an energy form other than heat, heat energy absorbed upon radiation from the collector. Thus, the heat in the moving fluid may be used to power steam turbines to generate electrical energy. Alternatively, the fluid may be conveying to the primary collector (e.g., boiler) for contributing to the heat collection thereby.

Pursuant to a supplemental feature of the present invention, where the step of reflecting includes the step of reflecting the solar energy from a reflective surface on the surface of the earth, the method further comprises the step of initially reflecting the solar energy from an auxiliary reflector in geostationary orbit above the earth, prior to reflecting the solar energy from the reflective surface. The auxiliary reflector may be aimed, as discussed above, towards the reflective surface during a substantial portion of night time at the reflective surface by operating a plurality of thrusters on the auxiliary reflector in response to alignment signals carried by laser from the surface of the earth.

Pursuant to yet another feature of the present invention, where the step of reflecting includes the step of reflecting the solar energy from a reflective surface on the surface of the earth, the method further comprises the steps of (i) reflecting, from the reflective surface, radio waves originating in outer space, (ii) receiving the reflected radio waves via a radio antenna disposed above the reflective surface, and (iii) transmitting the radio signals from the antenna for storage and for subsequent radio signal processing. Generally, it is contemplated that these steps of reflecting, receiving and transmitting are performed during night time at the reflective surface. However, daytime use is also possible.

In a solar energy collection system in accordance with the present invention, the folded optical path generated by the directional mirrors allows the placement of the solar energy collector (e.g., thermal converter unit or boiler) at ground or below ground level, thereby resulting in higher thermal conversion efficiencies and less expensive housing and support structures.

The stationary primary reflector permits use of the facility during off-cycle hours (e.g., at night) as a radio astronomy facility which enables cost sharing in both construction and operation of the facility.

BRIEF DESCRIPTION OF THE DRAWING

FIG. 2 is a diagram of a modification of the solar energy concentrating and collecting system of FIG. 1.

FIG. 3 is a partial schematic side elevational view of a modification of a primary reflector illustrated in FIG. 2.

FIG. 8 is a schematic side elevational view, on a reduced scale, of the auxiliary reflector of FIG. 7.

FIG. 9 is a schematic plan view, on a smaller scale, of the auxiliary reflector of FIG. 7.

DETAILED DESCRIPTION

Figure 1:
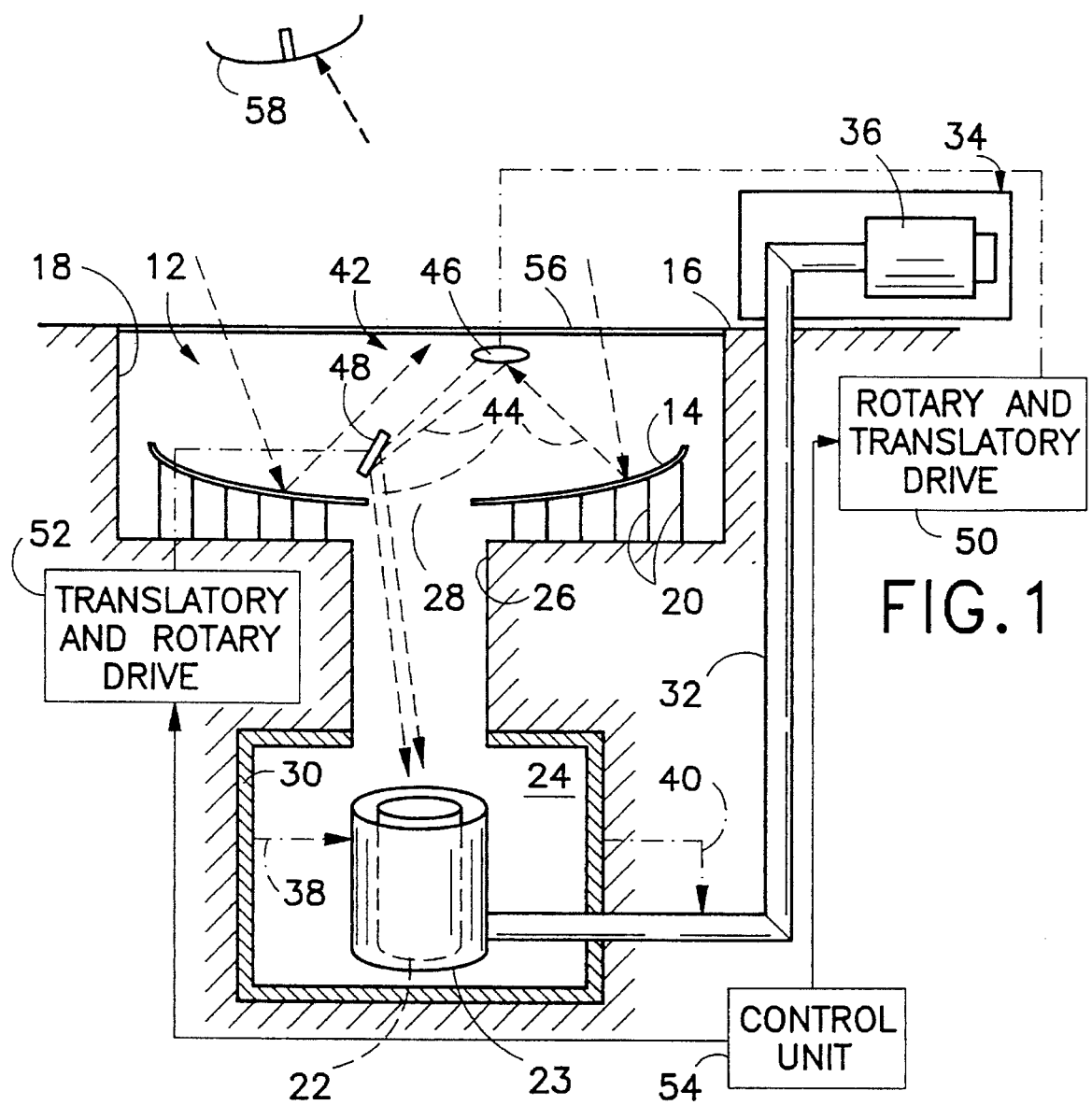
FIG. 1 is a diagram of a solar energy concentrating and collecting system in accordance with the present invention.

As illustrated in FIG. 1, a power generating system comprises a solar concentrator 12 defining an effectively concave stationary reflective surface 14 acting as a primary focusing reflector. Primary reflector 14 is disposed on a surface 16 of the earth and, more particularly, below ground level, in a depression or recess 18 in the earth's surface 16. For purposes of facilitating assembly, primary reflector 14 may comprise a plurality of mirror segments (not shown) carried by supports or uprights 20.

As further illustrated in FIG. 1, a solar collector 22, e.g., a fluidic heater or boiler, is disposed in an insulating cavity or container 23 which is in turn disposed in an underground chamber or cavity 24. Chamber 24 is provided with an access opening 26 which is aligned with an aperture 28 in primary reflector 14. Underground chamber 24 is further provided with an insulating lining 30 adapted to absorb infrared and near millimeter radiation, as well as convection heat, emanating from solar collector 22 and its associated cavity or container 23. To enable transport and utilization of the absorbed heat, lining 30 may be provided with fluid conducting pipes (not shown).

Solar collector 22 is operatively connected, e.g., via a steam or superheated fluid conduit 32, to an electrical-power generating station 34 located on the earth's surface 16. The steam or superheated fluid conveyed via conduit 32 is used, for example, to power a steam turbine and electrical generator assembly 36 in station 34. Lining 30 of underground chamber 24 may reradiate absorbed heat energy at 38 to collector 22 or siphon absorbed heat energy at 40 to conduit 32.

As additionally illustrated in FIG. 1, directional componentry 42 is provided for directing concentrated solar energy from primary reflector 14 along a predefined folded transmission path 44 through aperture 28 and opening 26 to collector 22. Directional componentry 42 includes a first mirror 46 which is translatably disposed above primary reflector 14 and a secondary mirror 48 which is pivotably disposed at aperture 28 and access opening 26. Mirror 46 may be curved for assisting in the proper focusing of incoming solar energy onto collector 22. Mirror 48 is preferably flat but may also be curved.

A rotary and translatory drive 50 is operatively linked to mirror 46 for orienting and shifting that mirror, while a translatory and rotary drive 52 is operatively coupled to mirror 48 for moving and pivoting that mirror. A control unit 54 is connected to drives 50 and 52 for coordinating the shifting of the mirrors to track the motion of the sun, i.e., to ensure continued guidance of the concentrated solar energy through aperture 28 and opening 26 to collector 22 during a substantial portion of a day.

Mirror 46 is shiftably mounted to a track or rail 56 which extends diametrically across the top of recess 18. Rail 56 may itself be movably mounted to the earth's surface 16 for rotation about a vertical axis, thereby facilitating daily tracking of the sun throughout the year. The top of recess 18 may be provided with a transparent cover (not separately shown) for further protecting primary reflector 14 from the elements.

During off-cycle times, primary reflector 14 may be used to focus, onto an antenna 58, radio waves arriving from outer space. Antenna 58 is movably disposed in a fashion similar to the mounting of mirror 46 and may be placed at a greater distance than mirror 46 from primary reflector 14 so as to be located at the focal point of primary reflector 14. Antenna 58 is linked to a conventional radio wave processing system for astronomical investigations wherein signals are collected via several dishes or radio telescopes (primary reflectors) and time tagged to a "world" atomic clock. The tagged signals are recorded digitally on tape at each site for later processing. As in conventional radio astronomy, the signals are processed in pairs. A cross-correlation process is used to determine the relative phases of the signals. The signals from different dishes should be identical but relatively phase shifted owing to the different locations of the radio telescopes. A known process in very large baseline interferometery (VLBI) is used to determine the intensity and phase of all the signals, which are plotted on a grid representing locations (due to rotation of the earth and, concomitantly, other radio telescope sites). A Fourier Transform process is commonly used to obtain an image of a distant galaxy from the intensity/phase grid.

As shown in FIG. 2, a modified power generating system comprises a solar concentrator 62 defining an effectively concave stationary reflective surface 64 acting as a primary focusing reflector. Primary reflector 64 is disposed on a surface 66 of the earth, essentially at ground level.

For purposes of facilitating assembly, primary reflector 64 may comprise a plurality of concave mirror segments 68 (FIG. 3) carried by respective supports or uprights 70. In some applications, the mirror segments 68 can be falt surfaces.

As further shown in FIG. 2, a solar collector 72, e.g., a fluidic heater or boiler, is disposed in an insulating cavity or container 73 itself disposed in an underground chamber or cavity 74. Concentrated solar radiation from primary reflector 64 enters chamber 74 via an access opening 76 in the ground and via an aperture 78 in primary reflector 64. Underground chamber 74 is provided with an insulating lining 80 which is adapted to absorb radiation and convection heat emanating from solar collector 72 and container 73. To enable transport and utilization of the absorbed heat, lining 80 may be provided with fluid conducting pipes (not shown).

As discussed above with reference to FIG. 1, solar collector 72 is operatively connected, e.g., via a steam or superheated fluid conduit, to a turbine/generator assembly in a electrical-power generating station. Lining 80 of underground chamber 74 may return absorbed heat energy to collector 72 or convey absorbed heat energy to another location.

As additionally shown in FIG. 2, directional componentry 82 is provided for directing concentrated solar energy from primary reflector 64 along a predefined folded transmission path 84 through aperture 78 and opening 76 to collector 72. Directional componentry 82 includes a first movable mirror 86 which is rotatably and translatably disposed above primary reflector 64 and a secondary movable mirror 88 which is pivotably and translatably disposed at aperture 78 and access opening 76. Mirror 86 may be curved for assisting in the proper focusing of incoming solar energy onto collector 72. Mirror 88 is preferably flat but may also be curved.

Directional componentry 82 includes a lighter-than-air balloon 90 supporting mirror 86. Balloon 90 with its attached mirror 86 is anchored to the earth's surface 66 by a plurality of tension cables 92 and 94. Mirror 86 is accordingly shifted by operating winches 96 and 98 to selectively pay out and alternately retract cables 92 and 94. A rotary and translatory drive 100 is operatively coupled to mirror 88 for pivoting and moving that mirror. A control unit 102 is connected to winches 96 and 98 and rotary and translatory drive 100 for coordinating the shifting of mirrors 86 and 88 to track the motion of the sun.

It is to be noted that collectors 22 and 72 may be disposed above ground. However, the thermal efficiencies are better if the collectors are disposed in underground thermal cavities 24 and 74. Insofar as the capitalization or initialization costs are greater in the latter case, it may be more cost effective in some circumstances to place the collector 22 or 72 above ground. In any event, the capitalization expenses are less in both these embodiments than in the conventional configuration where the collector is disposed at a height above the earth's surface.

It is to be further noted that primary reflector 64 may be disposed in a recess, below the earth's surface 66. Conversely, primary reflector 14 may be disposed above the earth's surface 16.

Figure 4:
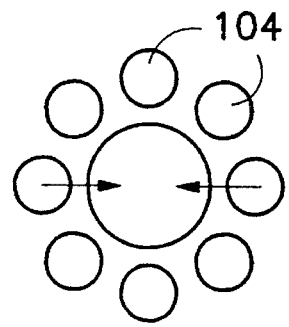
FIG. 4 is a diagrammatic plan for an installation having a plurality of primary reflectors for concentrating incoming solar radiation and a single collector.
Figure 5:
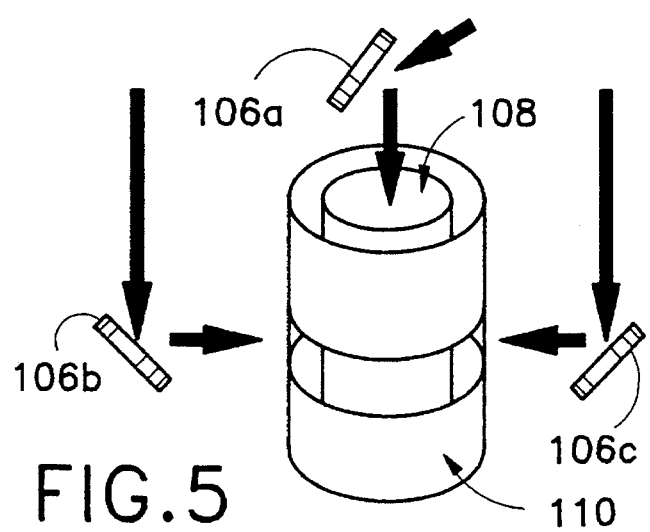
FIG. 5 is a schematic perspective view of a solar energy collector, showing incoming radiation directed along multiple folded transmission paths from a plurality of primary reflectors as illustrated in FIG. 4.

As depicted in FIG. 4, the concentration of solar radiation may be implemented by a plurality of concave primary reflectors 104 spaced from one another on the earth's surface. As depicted schematically in FIG. 5, concentrated solar radiation focused by reflectors 104 is directed by respective pivoting secondary mirrors 106a, 106b, 106c to a single collector 108, e.g., fluidic heater or boiler. Boiler 108 is disposed over a ground surface in an insulating cavity or container 110. Boiler 108 may thus be located on the earth's surface (not designated), at ground level or underground. In the latter case, of course, the directional componentry, including mirrors 106a, 106b, 106c, is adapted for guiding beams from multiple primary reflectors 104 through respective access openings or a single access opening to boiler 108.

Figure 6:
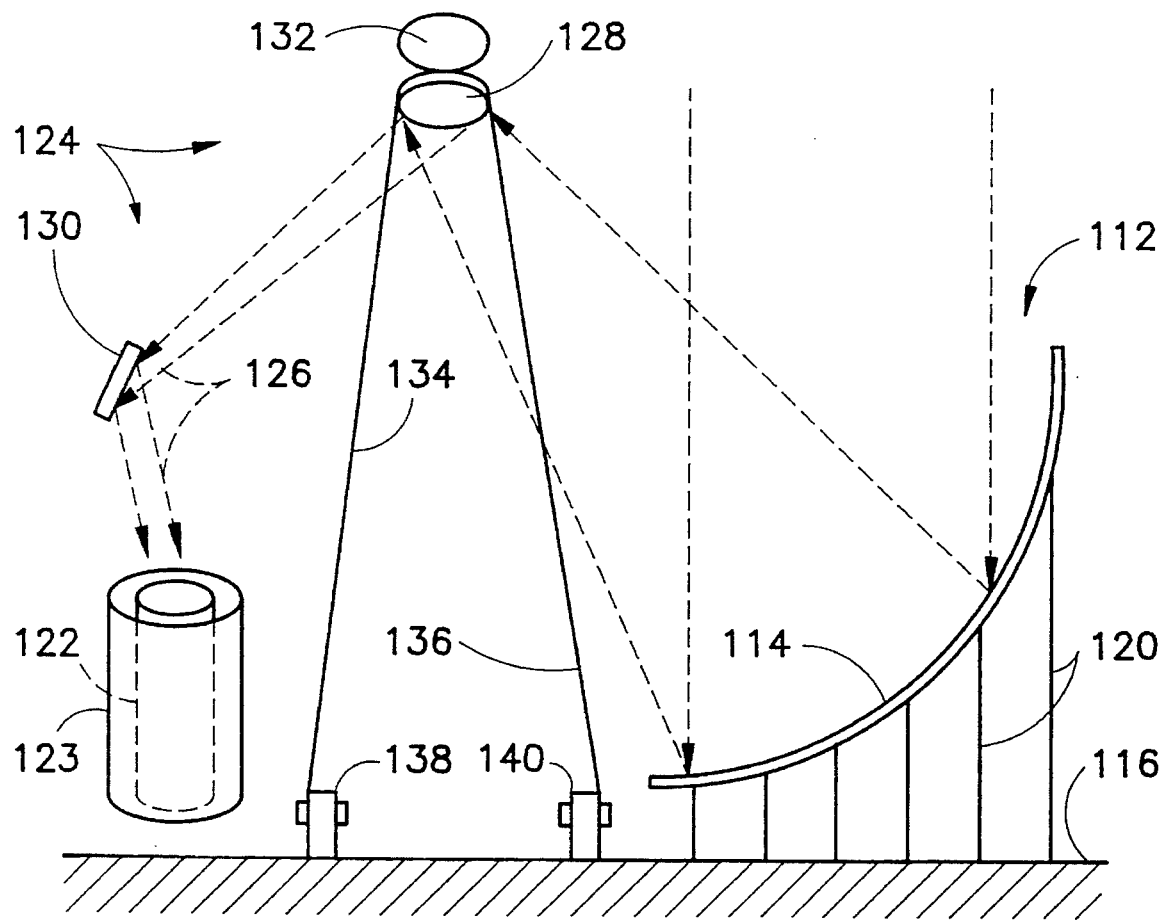
FIG. 6 is a diagram similar to FIGS. 1 and 2, showing a modification of the solar energy concentrating and collecting systems of FIGS. 1 and 2, adapted for an installation as depicted in FIG. 4.

As illustrated in FIG. 6, a power generating assembly for use in the installation of FIG. 4 includes an off-set type solar concentrator 112 defining an effectively concave stationary reflective surface or primary focusing reflector 114. Primary reflector 114 is disposed on a surface 116 of the earth, at ground level. For purposes of facilitating assembly, primary reflector 114 may comprise a plurality of mirror segments (not shown) carried by supports or uprights 120.

As further illustrated in FIG. 6, a solar collector 122, e.g., a fluidic heater or boiler, is disposed with an insulating cavity or container 123 either in an underground chamber or cavity (not shown) or at ground level. As discussed above with reference to FIGS. 1 and 2, solar collector 122 is operatively connected, e.g., via a steam or superheated fluid conduit, to a turbine/generator assembly in a electrical-power generating station.

As additionally shown in FIG. 6, directional componentry 124 is provided for directing concentrated solar energy from primary reflector 114 along a predefined folded transmission path 126. Directional componentry 124 includes a first mirror 128 which is translatably and rotatably disposed at a height or elevation above primary reflector 114 and a secondary mirror 130 which is pivotably and translatably disposed at collector 122. One or both mirrors 128 and 130 may be curved for assisting in the proper focusing of incoming solar energy onto collector 122.

Directional componentry 124 includes a lighter-than-air balloon 132 supporting mirror 128. Balloon 132 with its attached mirror 128 is anchored to the earth's surface 116 by a plurality of tension cables 134 and 136. Mirror 128 is accordingly shifted by operating schematically represented winches 138 and 140 to selectively pay out and alternately retract cables 134 and 136.

It is to be noted that collector 122 may be disposed in an underground cavity.

As shown in FIG. 6, mirror 128 and its shifting controls (cables 134 and 136 and winches 138 and 140) are disposed between collector 122 and the respective primary reflector 114. The arrangement or installation of FIG. 4 thus has a point symmetric form, with collector 122 at the center. Each primary reflector 114 has its own directional mirrors 128 and 130. Mirror 130 is the same as one of the mirrors 106a, 106b, 106c of FIG. 5.

Figure 7:
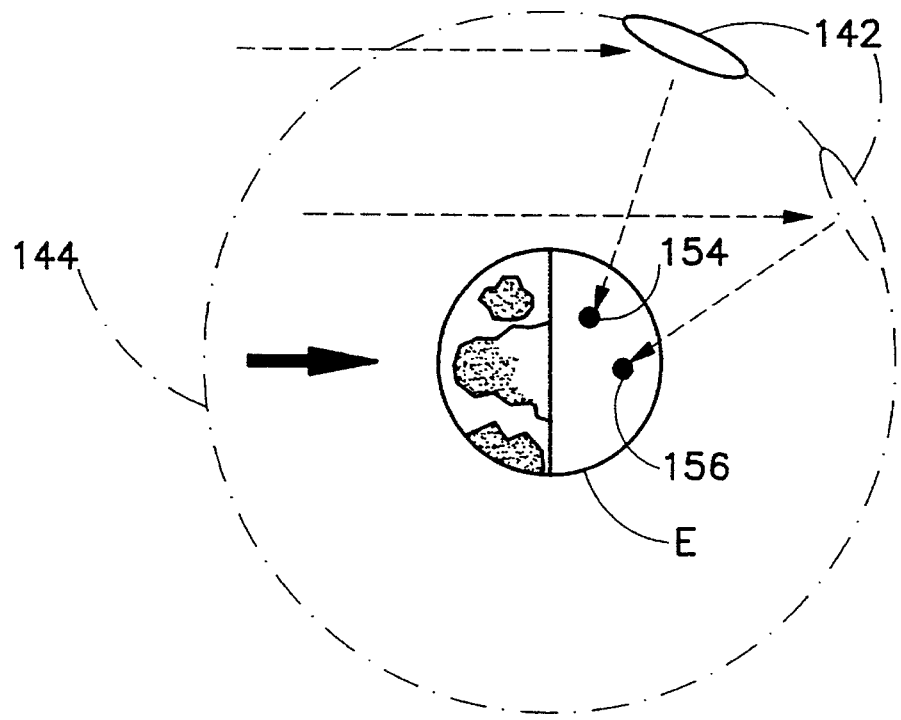
FIG. 7 is a diagram of a further modification of a solar energy concentrating and collecting system in accordance with the present invention, showing an auxiliary reflector in geosynchronous orbit.

As depicted in FIG. 7, a solar energy collecting system as described hereinabove may be adapted for night time use by providing an auxiliary reflector 142 disposed in a geostationary or geosynchronous orbit 144 above the earth E. As illustrated in FIGS. 8 and 9, auxiliary reflector 142 may take the form of a thin-membrane balloon 146 held by internal tension cables or struts 148 to assume, upon pressurization, a predetermined shape defining a slightly concave or flat surface 150. Surface 150 is silvered to reflect solar energy. Positioning elements in the form of four pairs of ion thrusters 152 are fixed to auxiliary reflector 142 for aiming the auxiliary reflector towards a primary reflector 154 or 156 (FIG. 7) on the earth E during a substantial portion of night time at the collector. Thrusters 152 must provide sufficient thrust to turn auxilary reflector 142 as it orbits, to maintain the proper direction of reflection to illuminate a selected primary reflector site.

Thrusters 152 may be powered by solar energy collected by a solar cell array 158 attached to auxiliary reflector 142. Thrusters 152 are controlled in response to an alignment signal carried from primary reflector 154 (or, at a different time, 156) via a lower-power laser beam generated at the earth's surface proximately to the primary reflector. The laser beam carrying the alignment or targeting signal is locked onto and sensed by a detector 160 mounted to auxiliary reflector 142. It is to be observed that the secondary mirror of the earth-bound collector need not move at night since the beam from the orbiting auxiliary reflector 142 always arrives at the same angle.

With the system of FIG. 7, a solar energy collection facility as described hereinabove with references to FIGS. 1, 2, 4, 6 can be used through as much as 80 percent of the normal night time, in addition to the day light hours. This will increase efficiency and concomitantly reduce energy costs.

In operating each of the systems described above, solar energy is reflected at least partially upwardly from a stationary concave primary reflector on the surface of the earth. The reflected energy is directed by a pair of movable mirrors along a folded or kinked path from the primary reflector to a solar energy collector disposed either at ground level on the earth's surface or in an underground chamber. The energy reflected by the primary reflector is focused thereby, and possibly by one or more of the directional mirrors, upon the collector. The collector is then operated to convert the concentrated solar energy to another energy form.

Directing the reflected energy along the folded transmission path includes the step of gradually shifting the directional mirrors disposed along the transmission path, thereby ensuring continued guidance of the reflected solar energy to the collector during a substantial portion of a day. The mirrors are translated and rotated to achieve this tracking of the sun.

Boiler 22, 72, 108, 122 may be an inverted or "inside-out" version of a standard power tower. The absorption surface of the boiler is inside the boiler, as in a so-called "black body" cavity. The concentrated radiation from all dishes or primary reflectors is fed in through the top of the boiler, rather than around the periphery. Accordingly, the energy absorber is like a "well," on the inside of the boiler. The energy absorbing fluid or coolant flows in conduits along the inside surface of the boiler.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A power generating system comprising:

solar concentrating means defining an effectively concave reflective surface on a surface of the earth for concentrating incoming solar energy, said reflective surface having a stationary center of gravity;

solar collecting means fixed to the surface of the earth for receiving solar energy concentrated by said concentrating means and converting the concentrated solar energy to another energy form; and directing means for directing concentrated solar energy from said concentrating means along predefined folded transmission paths to said collecting means.

2. The system defined in claim 1 wherein said directing means includes a pair of mirrors spaced from one another and means operatively connected to at least one of said mirrors for translating same relative to said reflective surface.

3. The system defined in claim 2 wherein said directing means includes shifting means operatively connected to said mirrors for moving said mirrors to ensure continued guidance of the concentrated solar energy to said collecting means during a substantial portion of a day.

4. The system defined in claim 3 wherein said shifting means includes means for pivoting at least one of said mirrors.

5. The system defined in claim 4 wherein one of said mirrors is located at a greater elevation than said concentrating means and another of said mirrors, said shifting means further including means for translating said one of said mirrors, said means for pivoting being operatively connected to said another of said mirrors.

6. The system defined in claim 3 wherein said directing means includes a lighter-than-air balloon supporting one of said mirrors, said one of said mirrors being secured to said balloon, said balloon and said one of said mirrors being anchored to the surface of the earth by a plurality of tension cables.

7. The system defined in claim 6 wherein said shifting means includes means for selectively paying out and alternately retracting said cables.

8. The system defined in claim 1 wherein a substantial portion of said concentrating means is located below ground level.

9. The system defined in claim 1 wherein said concentrating means includes a plurality of concave reflective surfaces spaced from one another on the surface of the earth, said directing means including a plurality of mirrors equal in number to said reflective surfaces and each disposed at a greater elevation than a respective reflective surface.

10. The system defined in claim 9 wherein said directing means includes shifting means operatively connected to said mirrors for moving said mirrors to ensure continued guidance of the concentrated solar energy to said collecting means during a substantial portion of a day.

11. The system defined in claim 1 wherein said concentrating means includes a plurality of mirror segments stationary with respect to the surface of the earth.

12. The system defined in claim 1 wherein said collecting means includes a boiler.

13. The system defined in claim 1 wherein said collecting means is disposed in an underground chamber provided with an access opening, said transmission path extending to said collecting means through said access opening.

14. The system defined in claim 13 wherein said chamber is provided with a heat absorbing lining, whereby energy radiating from said collecting means is at least partially captured.

15. The system defined in claim 1, further comprising an auxiliary reflector in geostationary orbit above the earth and positioning means at least partially fixed to said auxiliary reflector for aiming said auxiliary reflector towards said reflective surface during a substantial portion of night time at said collecting means.

16. The system defined in claim 15 wherein said positioning means includes a plurality of ion thrusters.

17. The system defined in claim 16 wherein said positioning means also includes a solar cell assembly for providing power for operating said thrusters.

18. The system defined in claim 15 wherein said positioning means includes a receiver for detecting a laser alignment signal from the surface of the earth.

19. The system defined in claim 1, further comprising a radio antenna disposed above said concave reflective surface, said radio antenna being operatively connected for radio signal processing.

20. A power generating system comprising:

solar concentrating means defining an effectively concave reflective surface on a surface of the earth for concentrating incoming solar energy, said reflective surface having a stationary center of gravity;

solar collecting means disposed on the surface of the earth for receiving solar energy concentrated by said concentrating means and converting the concentrated solar energy to another energy form; and directing means for directing concentrated solar energy from said concentrating means along a predetermined transmission path to said collecting means, said directing means including a mirror and a lighter-than-air balloon supporting said mirror, said balloon and said mirror being anchored to the surface of the earth by a plurality of tension cables.

21. The system defined in claim 20 wherein said collecting means is disposed in an underground chamber provided with an access opening, said directing means further including an auxiliary mirror juxtaposed to said access opening for guiding concentrated solar radiation through said access opening to said collecting means, further comprising shifting means operatively connected to said auxiliary mirror for moving said auxiliary mirror to ensure continued guidance of the concentrated solar energy through said access opening to said collecting means during a substantial portion of a day.

22. The system defined in claim 21 wherein said shifting means includes means for pivoting said auxiliary mirror.

23. The system defined in claim 20 wherein said shifting means includes means for selectively paying out and alternately retracting said cables.

24. The system defined in claim 20 wherein a substantial portion of said concentrating means is located below the surface of the earth.

25. A power generating method comprising the steps of:

reflecting solar energy at least partially upwardly from a reflector on a surface of the earth, said reflector having a stationary center of gravity;

directing the reflected energy along folded transmission paths to a solar energy collector in an underground chamber;

focusing the reflected energy upon said collector; and operating said collector to convert the concentrated solar energy to another energy form;

said step of directing including the step of shifting a plurality of mirrors disposed along said transmission path to ensure continued guidance of the reflected solar energy to said collector during a substantial portion of a day.

26. The method defined in claim 25 wherein said step of shifting includes the steps of translating said mirrors and rotating said mirrors.

27. The method defined in claim 25 wherein said step of shifting includes the step of selectively paying out and alternately retracting cables extending to a lighter-than-air balloon supporting one of said mirrors, said one of said mirrors being secured to said balloon.

28. The method defined in claim 25, further comprising the step of absorbing heat radiated from said collector.

29. The method defined in claim 28, also comprising the step of converting, into an energy form other than heat, heat energy absorbed upon radiation from said collector.

30. The method defined in claim 25, further comprising the step of initially reflecting said solar energy from an auxiliary reflector in geostationary orbit above the earth, prior to reflecting said solar energy from said reflective surface.

31. The method defined in claim 30, further comprising the step of aiming said auxiliary reflector towards said reflective surface during a substantial portion of night time at said reflective surface.

32. The method defined in claim 31 wherein said step of aiming includes the step of operating a plurality of thrusters on said auxiliary reflector in response to alignment signals carried by laser from the surface of the earth.

33. The method defined in claim 25 wherein said step of reflecting includes the step of reflecting said solar energy from a reflective surface on the surface of the earth, further comprising the steps of:

reflecting, from said reflective surface, radio waves originating in outer space;

receiving the reflected radio waves via a radio antenna disposed above said reflective surface; and transmitting said radio signals from said antenna for storage and for subsequent radio signal processing.

34. The method defined in claim 33 wherein said steps of reflecting said radio waves, receiving and transmitting are performed during night time at said reflective surface.

35. The method defined in claim 25 wherein said step of focusing is accomplished at least partially during said step of reflecting, said stationary reflector having an effectively concave reflective surface on the surface of the earth.

36. A power generating method comprising:

concentrating solar energy at a solar concentrator on the surface of the earth;

directing the concentrated solar energy to a first mirror disposed above the solar concentrator;

subsequently reflecting the concentrated solar energy from said first mirror to a second mirror disposed above said solar concentrator;

redirecting the concentrated solar energy from said second mirror to a solar energy collector on the surface of the earth;

translating said first mirror with respect to said solar concentrator to ensure continued guidance of the concentrated solar energy to said solar energy collector during a substantial portion of a day; and operating the solar energy collector to convert the solar energy to another energy form.

37. The method defined in claim 36 wherein said concentrator has a stationary center of gravity.

* * * * *